United States Patent [19]

Behr

[11] 4,232,528
[45] Nov. 11, 1980

[54] FROST DETECTOR

[75] Inventor: Joseph L. Behr, St. Louis County, Mo.

[73] Assignee: Emerson Electric Co., St. Louis, Mo.

[21] Appl. No.: 887,380

[22] Filed: Mar. 16, 1978

[51] Int. Cl.³ .................. G08B 19/02; F25D 21/02
[52] U.S. Cl. .................................. 62/140; 340/583; 250/239
[58] Field of Search .................. 62/140, 151, 80; 340/583; 250/239, 577

[56] References Cited

U.S. PATENT DOCUMENTS

| 2,297,370 | 9/1942 | Siedle ........................................ 62/80 |
| 3,188,828 | 6/1965 | Wayne ...................................... 62/140 |
| 3,204,109 | 8/1965 | Goodwin .................................. 250/239 |
| 3,822,384 | 7/1974 | Chapron et al. ................... 250/239 X |
| 3,908,129 | 9/1975 | Akers ..................................... 250/577 |

Primary Examiner—William E. Wayner
Attorney, Agent, or Firm—Polster, Polster and Lucchesi

[57] ABSTRACT

A refrigeration system is provided with an improved frost detector for detecting frost on an evaporator coil of the system. The detector includes a saddle mounting structure adapted for direct mounting to the tubular coils conventionally employed in condensers and evaporators of refrigeration systems. An energy source and a sensor carried by the mounting structure are positioned on opposite sides of the tubular coil. The sensor is irradiated by the energy source until frost growth on the coil tube obstructs the line of sight path between the source and the sensor. Means are provided for adjusting the line of sight path with respect to the coil tube so that the thickness of frost permitted to accumulate before defrost actuation can be varied for particular applications. By utilizing a narrow beam device as an irradiation source, very precise control of the defrost cycle can be obtained.

14 Claims, 6 Drawing Figures

FROST DETECTOR

BACKGROUND OF THE INVENTION

This invention relates to a defrosting control device, and more particularly, to an improved frost sensor used to control the defrost cycle of a refrigeration system. While the invention is described with particular emphasis in respect to refrigeration systems, those skilled in the art will recognize the wider applicability of the inventive concepts disclosed hereinafter.

Refrigeration systems, particularly the evaporator coils of refrigerators, air conditioning equipment or heat pump systems, are susceptible to frost accumulation during operation. Frost accumulation is undesirable in that it decreases the cooling efficiency of the system, reduces the capacity of the system, and raises operating cost. Even though its defficiencies are well known, frost accumulation and the related problem of detection have plagued refrigeration systems for a long time, and a number of methods and devices have been proposed to initiate defrost cycles for refrigeration systems. For example, timers often are employed to initiate a defrost cycle after some elapsed time period. Mechanical counters have been utilized in certain domestic appliances to initiate a defrost cycle after some preset number of door openings on the appliance. Photoelectric ice detecting devices also have been proposed for frost detecting purposes. The photoelectric detecting devices in general operate by causing radiant energy from a light source to be reflected, scattered, refracted or otherwise transmitted from the radiant energy source to a sensor, the amount of radiant energy transmitted in turn being dependent upon the frost or ice build-up of a particular sensed surface.

While it is known that frosting inhibits the efficiency of the refrigeration system and reduces the system capacity, that degradation does not occur immediately, and most systems are capable of accumulating frost for some predetermined period before efficiency begins to decrease. The problem of course, is to be able to detect that amount of frost which inhibits system efficiency, and to initiate a defrost cycle precisely when efficiency begins to decrease. In the past, frost detectors of which I am familiar have been unable to accurately measure frost growth so that they have not been able to initiate a defrost cycle precisely when that defrost is required. Defrost cycle initiation at times other than the optimum frost condition is known in the art as a false defrost cycle. False defrost cycles decrease system efficiency and increase operating costs, which defeats the very purpose of the frost detector in the first place. While the invention disclosed hereinafter employs a photo cell as the sensing device, the sensor construction is distinguishable from prior art detectors employing photo cell devices in that the detector is designed for direct placement on the coil of the evaporator of a refrigeration system. In addition, the mounting structure is adjustably mounted with respect to a tangent along the outer surface of the tubular coil structure so that the irradiating energy source and the sensor may be adjusted with respect to a line of sight tangent across the coil tube. A direct line of sight reading is maintained between the sensor and the energy source. Frost is allowed to accumulate on the tube until the frost growth itself blocks radiation transmission to the sensor. Since the sensor is a line of sight communicator, a very precise light beam source may be employed, and very small differences in frost growth detected. Those small differences in frost growth enable the detector to initiate the defrost cycle for the refrigeration system at or very near the frosting condition at which the frost begins to interfere with system efficiency. Since the detector is adjustably mounted with respect to a tangent across the coil tube, the precise desired frost condition before defrost initiation for any particular application may be obtained and set by field personnel.

One of the objects of this invention is to provide an improved frost sensor for detecting the presence of frost.

Another object of this invention is to provide a frost sensor which employs narrow line of sight communication between the radiation source and a sensor, frost growth in the application destroying the line of sight communication therebetween to trigger the defrost cycle.

Another object of this invention is to provide a frost detector which is adjustably mounted with respect to a tangent across a tubular structure on which the sensor is mounted.

Another object of this invention is to provide a low cost sensor that permits frost growth to a predetermined height with respect to the tube of an evaporator coil, and initiates the defrost cycle once that frost height is reached.

Other objects of this invention will be apparent to those skilled in the art in light of the following description and accompanying drawings.

SUMMARY OF THE INVENTION

In accordance with this invention, generally stated, a frost detector offering improved performance for initiating the defrost cycle of a refrigeration system is provided, which includes a relatively compact mounting structure adjustably mounted with respect to a frost bearing component of a refrigeration system. The detector permits accumulation of frost in a refrigeration system to a preselected height before initiating defrost. The mounting structure includes a photo receiver and a source of electromagnetic energy positioned on opposite sides of the frost bearing component in a line of sight relationship with respect to one another. The mounting structure includes adjustment means for varying the distance between the line of sight of the receiver and energy source with respect to the frost bearing component.

DESCRIPTION OF THE PREFERRED EMBODIMENT

Figure 6:
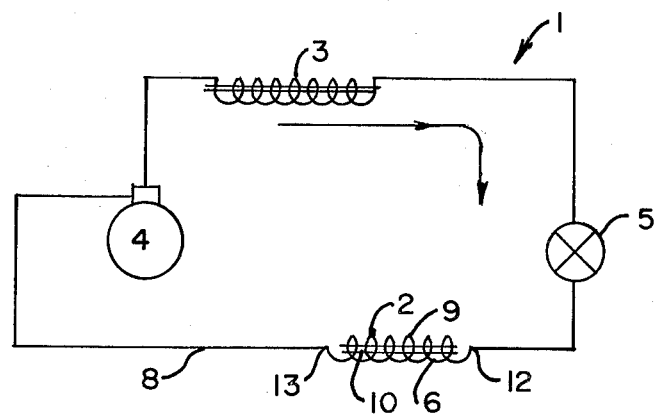
FIG. 6 is a diagrammatic view of a refrigeration system employing the frost detector of this invention.

Referring first to FIG. 6, reference numeral 1 indicates a refrigeration system employing one illustrative embodiment of frost detector 2 of this invention. The particular refrigeration system shown in FIG. 6 includes a compressor 4, a condenser coil 3, an appropriate expansion device 5, and an evaporator coil 6, which are interconnected to one another and the compressor 4 through a conduit system 8. The coil 3 is an outside coil for condensing the compressor refrigerant and the coil 6 is an inside coil for refrigerating the interior of an enclosure, such as a room or other space. The term "outside" for the coil 3 is intended to encompass a variety of locating positions for that coil. Conventionally, the outside coil 3 in fact is positioned outdoors in most conventional refrigeration systems. However, the coil may be placed in a variety of location including inside the building or space being refrigerated and all such locations are intended to be encompassed in the description of the coil as an outside coil. Refrigeration systems of the type just described are well known.

A suitable refrigerant is circulated through the system 1 in the direction of the arrow shown in FIG. 6 by the compressor 4, which conventionally includes a dynamoelectric machine, not shown, as its drive source.

Figure 1:
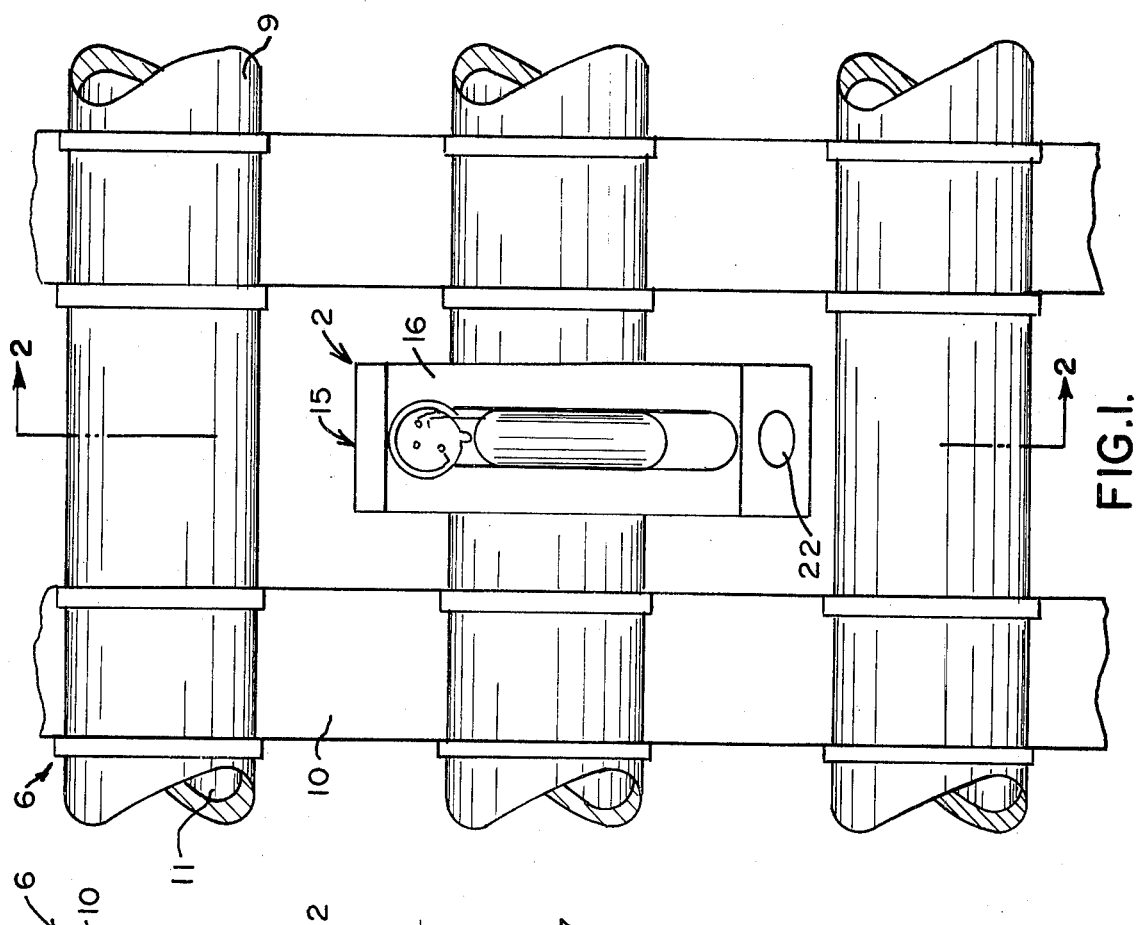
FIG. 1 is a top plan view of one illustrative embodiment of frost detector of this invention, shown deployed in an evaporator coil of a refrigeration system.
Figure 2:
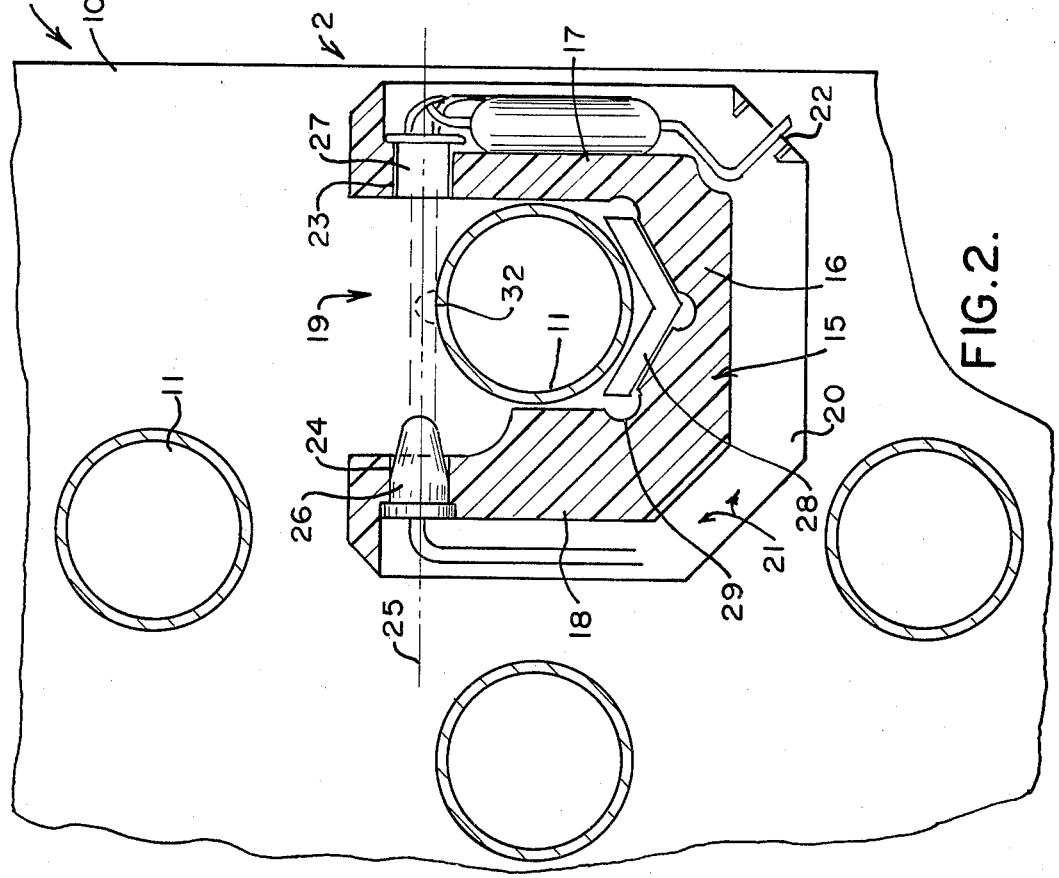
FIG. 2 is a sectional view taken along the line 2—2 of FIG. 1.

The coil 6 is conventional and generally includes a serpentine coil run 9 through a plurality of evaporator plates 10, best seen in FIGS. 1 and 2. The coil run 9 is formed from a plurality of tubes 11 which are joined to the conduit system 8 at an inlet 12 and an outlet 13 of the evaporator coil 6.

As will be appreciated by those skilled in the art, the evaporator coil 6, because of temperature and humidity conditions of the air passing across the coil, often has frost or ice formed on it. In particular, the ice can form on the tubes 11 and the plates 10. As indicated above, although frost affects the efficiency of the heat transfer between the refrigerant in the tubes and the air passing through or over the evaporator coil 6, the efficiency is not decreased appreciably until a considerable amount of frost builds up on the components of the evaporator 6.

In order to detect and control the operation of the refrigeration cycle so that a defrost operation is initiated when required, I have devised the frost detector 2, which is best seen in FIGS. 1 and 2. As there shown, the detector 2 includes a body 15 generally having a U-shape in cross section. The body 15 includes a base member 16, a first arm 17, and a second arm 18 integrally formed with the base member 16 and arranged in a conventional U-shape to define an open mouth channel 19 therebetween.

In the embodiment illustrated, the body 15 preferably is a molded plastic part having a generally solid material portion along the arms 17 and 18 and base 16 adjacent the channel 19, enclosed by an outer shell 20 about the solid material portion. The shell 20 and solid material portion of the body 15 delimit a hollow chamber area 21. The shell 20 has an opening 22 formed in it, communicating with the chamber 21. The opening 22 allows passage of electrical conductors through the shell 20 to permit interconnection of the electrical components of the detector 2 to a suitable power source.

The arm 17 has an opening 23 extending through the solid part of the arm 17, communicating with the channel 19 while the arm 18 has a similarly located opening 24 formed in it. The opening 24 also communicates with the channel 19. The openings 23 and 24 are aligned with one another along an axis 25. In the embodiment illustrated, the opening 24 is sized to receive an electromagnetic energy light source 26 while the opening 23 has a light sensitive receiver 27 mounted in it. The chamber 21 is employed to carry any associated electrical circuitry required for operation of the light source 26 and the receiver 27.

In embodiment of FIG. 2, the channel 19 has a plurality of grooves 29 formed along its lower portion, the grooves being designed to locate a shim 28. Shim 28 is designed to abut an individual one of the tubes 11 in the mounted position of the detector 2. The shim 28 functions to vary the position of the axis 25 with respect to a tangent at a point 32 on the tube 11. Although only a single size shim 28 is shown in FIG. 1, those skilled in the art will recognize that a range of shim 28 thicknesses may be provided to precisely locate the axis 25 with respect to the tangent 32. This is an important feature of my invention in that it permits the detector 2 to be adjustably mounted with respect to that tube 11 so that the amount of frost growth permitted in a particular application can be varied before initiation of a defrost cycle.

Figure 3:
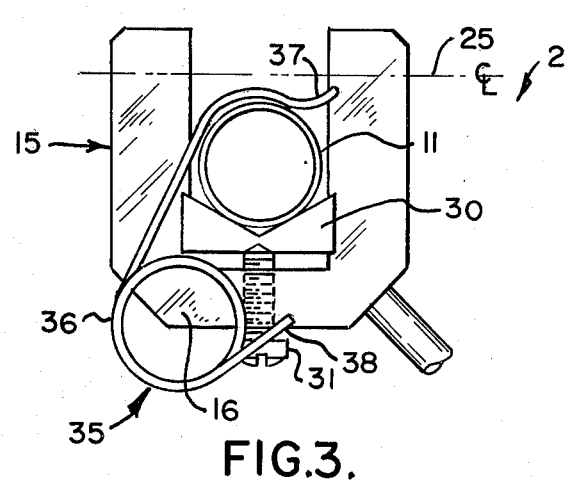
FIG. 3 is a view in side elevation of a second illustrative embodiment of frost detector of this invention.
Figure 4:
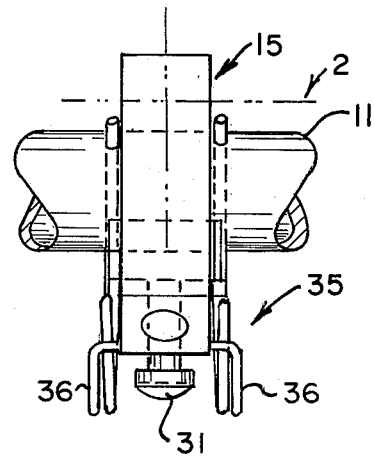
FIG. 4 is an end view thereof.
Figure 5:
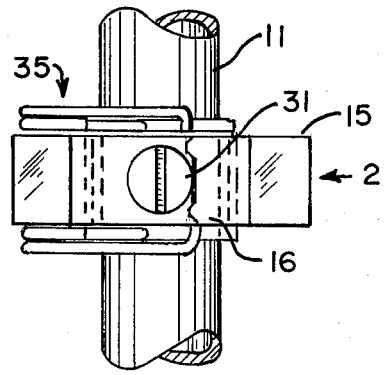
FIG. 5 is a bottom plan view thereof.

FIGS. 3, 4 and 5 illustrate a second embodiment of the detector 2, like reference numerals being used where appropriate. As there shown, the adjustment feature of the detector 2 is accomplished through the use of a tube support 30 which is movably mounted within the body 15 and is positioned through use of an adjusting screw 31 inserted through the base 16 of the body 15. The tube support 30 provides a function similar to that described in conjunction with the shim 28.

A spring clamp 35 is attached to the body 15 along the base member 16 and includes a coil spring 36 having a first end 37 and a second end 38. The end 38 is attached to the body 15, while the end 37 is mounted over the tube 11. As shown in FIG. 4, two of the coil springs 36 are employed to mount the detector 2 to the tube 11. The spring arrangement shown is compatible with either of the detector 2 embodiments described above.

Operation of the frost detector 2 is relatively simple to understand. The detector 2, being of relatively small size, may be inserted at any convenient location along the evaporator 6. Mounting is accomplished easily by use of the spring clamp 35. Thereafter, the body 15 is adjusted with respect to the tube 11 to permit growth of a desired amount of frost before initiation of a defrost cycle. I have found that very precise control of frost growth can be achieved with the detector 2. That is to say, by utilizing a narrow beam device for the light source 26, and by aiming the source across the tube 11, with respect to the tangent 32, precise control of defrost cycle initiation can be maintained. As frost forms, the beam width will narrow, but the intensity of the beam remains constant until the beam is completely cut off by a small additional growth of frost. Consequently, very precise repeatable sensing of frost growth is provided by the detector 2.

Numerous variations, within the scope of the appended claims, will be apparent to those skilled in the art in light of the foregoing description and accompanying drawings. Thus, while the detector 2 was described in its aplicational use in a refrigeration system, those skilled in the art will recognize that the detector 2 may find application in heat pump systems, and appliance cases, for example. As will be appreciated, a heat pump may be considered, for purposes of description, as a reverse cycle refrigeration system in which the evaporator and condenser coils exchange roles in respective cooling and heating modes. In those applications, the detector 2 may be employed in both condenser and evaporator coil sections. In most heat pump applications only one detector is required and is mounted in the outdoor coil where frost can form when that coil is the evaporator coil. This mode is commonly referred to as the heating mode. The particular design silhouette of the body 2, the adjustment means and the spring clamp may vary in other embodiments of this invention. While a "narrow beam" light source is described as preferred, those skilled in the art will recognize that the device 2 easily can employ a "wide" beam source in conjunction with a "small" area receiver. In either event, precise control of the defrost cycle is obtained. These variations are merely illustrative.

Having thus described the invention, what is claimed and desired to be secured by Letters Patent is:

1. In a refrigeration system including a compressor having a high pressure outlet side, a low pressure inlet side, a first coil operatively connected to said compressor, a second coil operatively connected to said compressor and to said first coil, each of said coils including a tubular member having a predetermined length for carrying a refrigerant fluid, the improvement which comprises frost detector means directly mounted to said tubular member, said frost detector having a structure for mounting said detector to said tubular member, said structure including a channel for receiving the outer diameter of said tubular member, electromagnetic energy source means mounted to said structure and positioned to direct a beam of electromagnetic energy across the periphery of said tubular structure, an electromagnetic energy sensor mounted to said structure and separated from said source on a diametrically opposite side of said tube, and means for varying the beam path with respect to a tangent along the outer diameter of said tube between said energy source and said energy sensor.

2. The improvement of claim 1 wherein said structure is U-shaped in cross section, respective arms of said U-shape receiving one of said energy source and said energy sensor, said U-shape defining the channel for receiving said tubular member.

3. The improvement of claim 2 wherein said electromagnetic energy source is an infrared, narrow beam light source.

4. The improvement of claim 2 wherein said beam varying means comprises shim means insertable between said tubular member along the base member of said U-shape.

5. The improvement of claim 2 wherein said varying means comprises selectively movable means for varying the height of a line of sight axis between said energy source and said receiver with respect to said tubular structure.

6. A frost detector, comprising:

a structure mountable on the coil tube of a refrigeration system including first and second arms disposed on opposite sides of said coil tube;
a light source mounted to one of said arms and positioned to direct electromagnetic energy toward the other of said arms;
a light sensitive receiver mounted to the other of said arms and positioned to receive light from said light source; and
means for adjusting the position of said arms with respect to a preselected tangent along the outer diameter of said tubular structure.

7. The frost detector of claim 6 wherein said adjustment means comprises at least one insert positioned between said structure and said coil tube.

8. The frost detector of claim 7 further including means for mounting said frost detector to said coil tube.

9. The frost detector of claim 8 wherein said mounting means comprises spring clip means for removably interconnecting said structure to said coil tube.

10. The frost detector of claim 6 wherein said adjustment means comprises a movably mounted member between said structure and said coil tube and means for adjusting the position of said movable member.

11. The frost detector of claim 10 further including means for mounting said frost detector to said coil tube.

12. The frost detector of claim 11 wherein said mounting means comprises spring clip means for removably interconnecting said structure to said coil tube.

13. The frost detector of claim 12 wherein said light source is an infrared, narrow beam electromagnetic energy generator source.

14. A frost detector, comprising:

a structure mountable on a frost bearing component in a refrigeration system, said frost bearing component having a first side and a second side, said structure including first and second arms constructed to permit positioning of the arms along the first and second sides of said frost bearing component;
a light source mounted to said structure in one of said first and second arms on the first side of said frost bearing component and positioned to direct electomagnetic energy toward the second side of said frost bearing component;
a light sensitive receiver mounted to said structure in the other of said first and second arms on the second side of said frost bearing component and positioned to receive light from said light source along a line of sight axis, the line of sight axis having a predetermining spacing between it and the frost bearing component; and
means for adjusting the spacing of said line of sight axis with respect to said frost bearing component so that the thickness of detectable frost accumulation on said frost bearing component is varied as the spacing is altered.

* * * * *

UNITED STATES PATENT AND TRADEMARK OFFICE
CERTIFICATE OF CORRECTION

PATENT NO. : 4,232,528
DATED : November 11, 1980
INVENTOR(S) : Joseph L. Behr

It is certified that error appears in the above—identified patent and that said Letters Patent is hereby corrected as shown below:

Column 4, line 60, "aplicational" should read

-- applicational --.

Column 6, line 31, "beam electromagnetic" should read

-- beam, electromagnetic --.

Signed and Sealed this

Twenty-third Day of June 1981

[SEAL]

Attest:

RENE D. TEGTMEYER

Attesting Officer     Acting Commissioner of Patents and Trademarks